US011321605B2

(12) United States Patent
Divekar et al.

(10) Patent No.: US 11,321,605 B2
(45) Date of Patent: May 3, 2022

(54) AUTOMATIC ASSEMBLY MATE CREATION FOR FREQUENTLY-USED COMPONENTS

(71) Applicant: Dassault Systemes SolidWorks Corporation, Waltham, MA (US)

(72) Inventors: Ameya Divekar, Pune (IN); Makarand Apte, Pune (IN); Shrikant Savant, Shrewsbury, MA (US)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 1207 days.

(21) Appl. No.: 15/810,840

(22) Filed: Nov. 13, 2017

(65) Prior Publication Data

US 2019/0147317 A1 May 16, 2019

(51) Int. Cl.
*G06F 30/00* (2020.01)
*G06N 3/04* (2006.01)
(Continued)

(52) U.S. Cl.
CPC .............. *G06N 3/04* (2013.01); *G06F 30/00* (2020.01); *G06F 30/17* (2020.01); *G06F 30/27* (2020.01);
(Continued)

(58) Field of Classification Search
CPC .............. G06N 3/04; G06N 3/08; G06N 3/02; G06F 30/00; G06F 30/17; G06F 30/27;
(Continued)

(56) References Cited

U.S. PATENT DOCUMENTS 8,645,107 B2    2/2014  Gibson et al.
9,383,895 B1 *  7/2016  Vinayak .............. G06F 3/04883
(Continued)

FOREIGN PATENT DOCUMENTS

CN    103617329 A  *  3/2014
CN    104159644 A  * 11/2014  .......... A63B 24/006
(Continued)

OTHER PUBLICATIONS

U.S. Pat. No. 20040098151 A1, short version, May 2004.*
Wang, et al., "Feature-Based Assembly Mating Reasoning", Journal of Manufacturing Syst., Society of Manufacturing Engineers, vol. 18, No. 3, Jan. 1, 1999, pp. 187-202.
Chen, et al. "An Integration of Neural Network and Rule-Based Systems for Design and Planning of Mechanical Assemblies", IEEE Transactions on Systems, Man and Cybernetics, vol. 23, No. 5, Sep. 1, 1993, pp. 1359-1371.
(Continued)

*Primary Examiner* — Kandasamy Thangavelu
(74) *Attorney, Agent, or Firm* — Hamilton, Brook, Smith & Reynolds, P.C.

(57) ABSTRACT

Methods and systems identify frequently-used CAD components and apply machine learning techniques to predict mateable entities and corresponding mate types for those components to automatically add components to a CAD model. An example method includes accessing information regarding CAD model parts and related mate information stored in a computer database, and dividing parts into a plurality of clusters having parts with similar global shape signatures. In response to a new part being added, contextual signatures of entities of the new part are input into a mateability predictor neural network to determine a mateable entity of the new part. Input into a mate-type predictor neural network is (i) a contextual signature of the mateable entity and (ii) a contextual signature of an entity of another part of the CAD model to determine a mate type between the
(Continued)

entities. A mate between the new part and the other part is automatically added based on the determined mate type.

20 Claims, 10 Drawing Sheets

(51) Int. Cl.
  *G06N 3/08* (2006.01)
  *G06T 19/00* (2011.01)
  *G06F 30/17* (2020.01)
  *G06F 30/27* (2020.01)
  *G06N 3/02* (2006.01)
  *G06F 111/04* (2020.01)
  *G06F 111/20* (2020.01)

(52) U.S. Cl.
  CPC .............. *G06N 3/08* (2013.01); *G06T 19/00* (2013.01); *G06F 2111/04* (2020.01); *G06F 2111/20* (2020.01); *G06N 3/02* (2013.01); *G06T 2219/012* (2013.01)

(58) Field of Classification Search
  CPC ............. G06F 2111/04; G06F 2111/20; G06F 30/13; G06T 19/00; G06T 2219/012; G05B 19/41875; A63B 24/00
  See application file for complete search history.

(56) References Cited

U.S. PATENT DOCUMENTS

| | | |
|---|---|---|
| 2002/0107673 A1 | 8/2002 | Haller et al. |
| 2004/0098151 A1* | 5/2004 | Carlucci ................. G06F 30/00 700/95 |
| 2013/0080121 A1 | 3/2013 | Gibson et al. |

FOREIGN PATENT DOCUMENTS

| | | | | |
|---|---|---|---|---|
| CN | 104704497 A | * | 6/2015 | ............. G06F 30/13 |
| CN | 105550389 A | * | 5/2016 | ............. G06F 30/17 |
| CN | 105785943 A | * | 7/2016 | ....... G05B 19/41875 |
| JP | 2001028015 A | * | 1/2001 | ............. G06F 30/00 |
| JP | 2009245157 A | * | 10/2009 | |
| JP | 2012252577 A | * | 12/2012 | |
| WO | WO 2008073978 A2 | * | 6/2008 | ............. G06F 17/50 |

OTHER PUBLICATIONS

EP Search Report, EP Application No. 18201618, dated Apr. 10, 2019.

* cited by examiner

Coincidence Face Highlighted

Concentric Face Highlighted

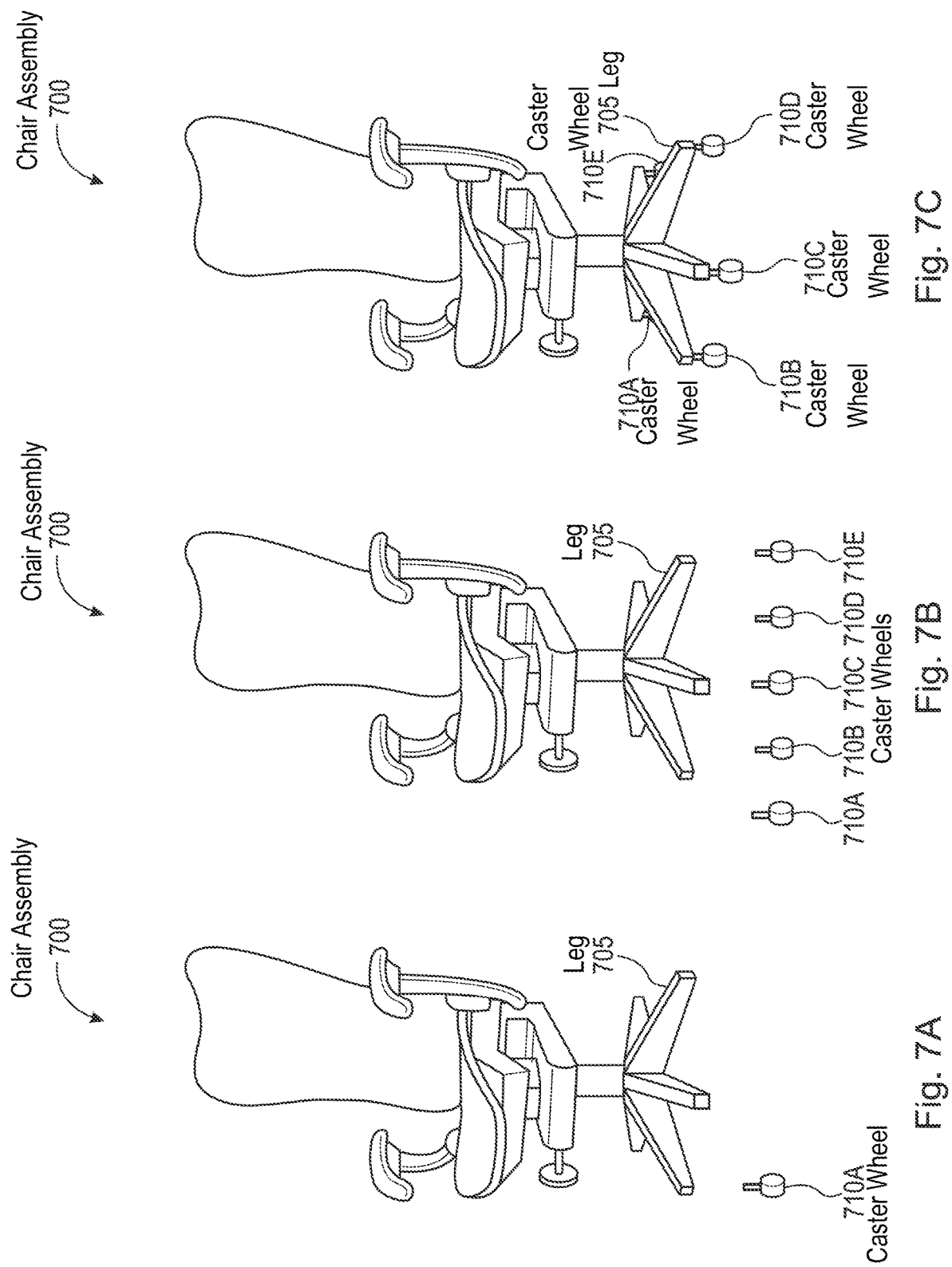

AUTOMATIC ASSEMBLY MATE CREATION FOR FREQUENTLY-USED COMPONENTS

BACKGROUND

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. A subassembly may also consist of other subassemblies. An assembly is designed using parts and subassemblies. Parts and subassemblies are hereinafter collectively referred to as components.

The following are definitions of certain terms that can be used when describing a 3D CAD system.

Assembly: A document in which parts, features, and other assemblies (subassemblies) are mated together. Parts and subassemblies can exist in documents separate from the assembly. For example, in an assembly, a piston can be mated to other parts, such as a connecting rod or cylinder. This assembly can then be used as a subassembly in an assembly of an engine.

Body: A solid body includes topological data and geometric data. The topological data (e.g., faces, edges, and vertices) in a solid body have corresponding geometric data in the same solid body. Each vertex corresponds to a point. Each edge corresponds to a curve. Each face corresponds to a surface. An example multi-body part for a wheel can include an axle body, rim body, and a number of spoke bodies to connect the axle and rim bodies.

Component: Any part or subassembly within an assembly.

Edge: A single outside boundary of a feature.

Entity: A discrete element, such a face, edge, vertex, etc.

Face: A selectable area (planar or otherwise) of a model or surface with boundaries that help define the shape of the model or surface. For example, a rectangular solid has six faces, and a cylindrical solid has three faces.

Feature: An individual shape that, combined with other features, makes up a part or assembly.

Large Design Review: A mode of assembly review that allows a very large assembly to open quickly, while still retaining capabilities that are useful when conducting design reviews of assemblies. In large design review mode, a use can: Navigate a design tree of the assembly, measure distances, create cross sections, hide and show components, and create, edit, and play back walk-throughs. Large design review mode can also be referred to as "Graphics Mode."

Lightweight: A part in an assembly that has only a subset of its model data loaded into memory. The remaining model data is loaded on an as-needed basis. Lightweight improves performance of large and complex assemblies.

Mate: A geometric relationship between entities (e.g., parts or bodies) in an assembly. Example mates include angle, coincident, concentric, distance, parallel, perpendicular, and tangent.

Part: A single 3D object made up of features. A part can include multiple bodies. A part can become a component in an assembly. Examples of parts include, for example, a bolt, pin, and plate.

Plane: A flat construction geometry.

Point: A singular location in a 3D model.

Resolved: A state of an assembly component in which it is fully loaded in memory. When resolved, all of the component's model data is available, so its entities can be selected, referenced, edited, used in mates, etc.

Subassembly: An assembly that is part of a larger assembly. For example, a steering mechanism of a car is a subassembly of the car.

Surface: A zero-thickness planar or 3D entity with edge boundaries.

Vertex: A point at which two or more edges intersect. Vertices can be selected for sketching, dimensioning, and many other CAD operations.

A solid modeling system may be a feature-based 3D CAD system wherein a part is constructed using various features. Examples of features include bosses, fillets, chamfers, cuts, holes, shells, lofts, and sweeps. CAD systems store the contents of parts, subassemblies, and assemblies in a data file. In addition to features, the contents of CAD data files may include design profiles, layouts, internal components (e.g., bodies), and graphical entities. A common task when designing CAD assemblies is to mate together entities of a CAD assembly according to geometrical relationships. For example, a hole and a pin may be mated in a coincident relationship along their axes. Assemblies that include a large number of mates require a design engineer to spend much time configuring the mates.

SUMMARY

The disclosed methods and systems identify frequently-used CAD components and apply machine learning techniques to predict mateable entities and corresponding mate types for those components. Based on these determinations, the frequently-used components can be automatically added to a CAD model.

One example embodiment is a computer-implemented method of automatically creating mates between geometric entities in a CAD model of a real-world object. The example method includes accessing information regarding CAD model parts and related mate information stored in a computer database. The method further includes dividing CAD model parts into a plurality of clusters, where each cluster includes CAD model parts having a similar global shape signature. A mateability predictor neural network is trained with mateability information for the CAD model parts of a cluster. The mateability predictor neural network is configured to provide mateability information in response to input of a contextual signature of an entity of a CAD model part. A mate-type predictor neural network is trained to identify one or more mate types between two entities. The method further includes, in response to a new part being added to the CAD model, inputting contextual signatures of a plurality of entities of the new part into the mateability predictor neural network to determine a mateable entity of the new part, and inputting into the mate-type predictor neural network (i) a contextual signature of the mateable entity of the new part and (ii) a contextual signature of an entity of another part of the CAD model to determine at least one mate type between the entities. At least one mate between the mateable entity of the new part and the entity of the other part of the CAD model is automatically added based on the determined at least one mate type.

Another example embodiment is a computer-implemented method of automatically creating mates between geometric entities of a CAD model of a real-world object and a new part. The example method includes accessing a mateability predictor neural network trained with mateability information for CAD model parts and inputting contextual signatures of a plurality of entities of the new part into the mateability predictor neural network to determine a mateable entity of the new part. The mateability predictor neural network is configured to provide mateability information in response to input of a contextual signature of an entity of a CAD model part. The method further includes accessing a mate-type predictor neural network trained to identify one or more mate types between two entities, and inputting into the mate-type predictor neural network (i) a contextual signature of the mateable entity of the new part and (ii) a contextual signature of an entity of another part of the CAD model to determine at least one mate type between the entities. At least one mate is automatically added between the mateable entity of the new part and the entity of the other part of the CAD model based on the determined at least one mate type.

Another example embodiment is a CAD system including a computer database and a processor operatively coupled to the computer database. The computer database is configured to store information regarding CAD model parts and related mate information. The processor is configured to divide CAD model parts into a plurality of clusters, where each cluster including CAD model parts having a similar global shape signature. The processor is further configured to train a mateability predictor neural network with mateability information for the CAD model parts of a cluster. The mateability predictor neural network is configured to provide mateability information in response to input of a contextual signature of an entity of a CAD model part. The processor is further configured to train a mate-type predictor neural network to identify one or more mate types between two entities. The processor is further configured to, in response to a new part being added to the CAD model, input contextual signatures of a plurality of entities of the new part into the mateability predictor neural network to determine a mateable entity of the new part, and input into the mate-type predictor neural network (i) a contextual signature of the mateable entity of the new part and (ii) a contextual signature of an entity of another part of the CAD model to determine at least one mate type between the entities. The processor is further configured to automatically add at least one mate between the mateable entity of the new part and the entity of the other part of the CAD model based on the determined at least one mate type.

Another example embodiment is a CAD system including a computer database and a processor operatively coupled to the computer database. The computer database is configured to store information regarding CAD model parts and related mate information. The processor is configured to access a mateability predictor neural network trained with mateability information for CAD model parts and input contextual signatures of a plurality of entities of the new part into the mateability predictor neural network to determine a mateable entity of the new part. The mateability predictor neural network is configured to provide mateability information in response to input of a contextual signature of an entity of a CAD model part. The processor is further configured to access a mate-type predictor neural network trained to identify one or more mate types between two entities and input into the mate-type predictor neural network (i) a contextual signature of the mateable entity of the new part and (ii) a contextual signature of an entity of another part of the CAD model to determine at least one mate type between the entities. The processor is further configured to automatically add at least one mate between the mateable entity of the new part and the entity of the other part of the CAD model based on the determined at least one mate type.

In some embodiments, a contextual signature for an entity of a part may be a numerical representation of contextual locations of the entity within the part. Such a contextual signature can be calculated by computing the ratios between distances of a centroid of the entity and planes of a bounding box around the part.

In some embodiments, dividing CAD model parts into a plurality of clusters can include, for each of a plurality of parts in the computer database, calculating a global shape signature of the part, and clustering a plurality of parts if the global shape signatures of the parts are within a threshold amount.

In some embodiments, the mateability predictor neural network can be trained with mateability information for the CAD model parts of a cluster having a relatively higher density compared to other clusters. The relatively higher density of the cluster can indicate that the parts of the cluster are frequently used in CAD models. The mateability predictor neural network can be trained with mateability information for all entities of the CAD model parts. Multiple mateability predictor neural networks can be trained, each corresponding to a different mate type. In some embodiments, the mate-type predictor neural network can be trained with (i) mateable entities of a cluster including frequently-used parts and (ii) all entities of parts with which the frequently-used parts mate.

In some embodiments, automatically adding at least one mate can include (i) determining a number of instances of the new part that are mateable with the other part of the CAD model, (ii) creating the number of instances of the new part, and (iii) mating entities of all instances of the new part to distinct entities of the other part of the CAD model.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 7A-7C illustrate representations of example steps of adding a frequently-used part to a CAD assembly, according to an example embodiment.

DETAILED DESCRIPTION

A description of example embodiments follows.

Figure 1B:
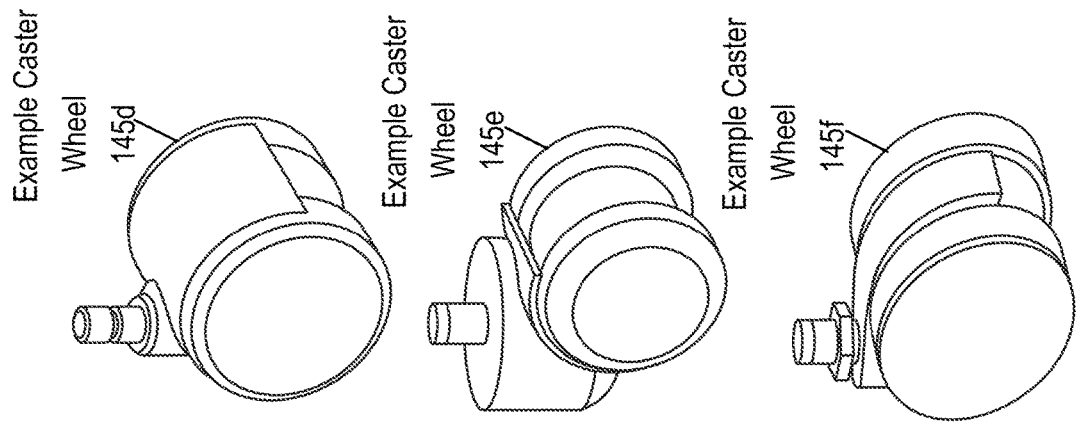
FIGS. 1A and 1B illustrate example CAD assemblies and parts.
Figure 1A:
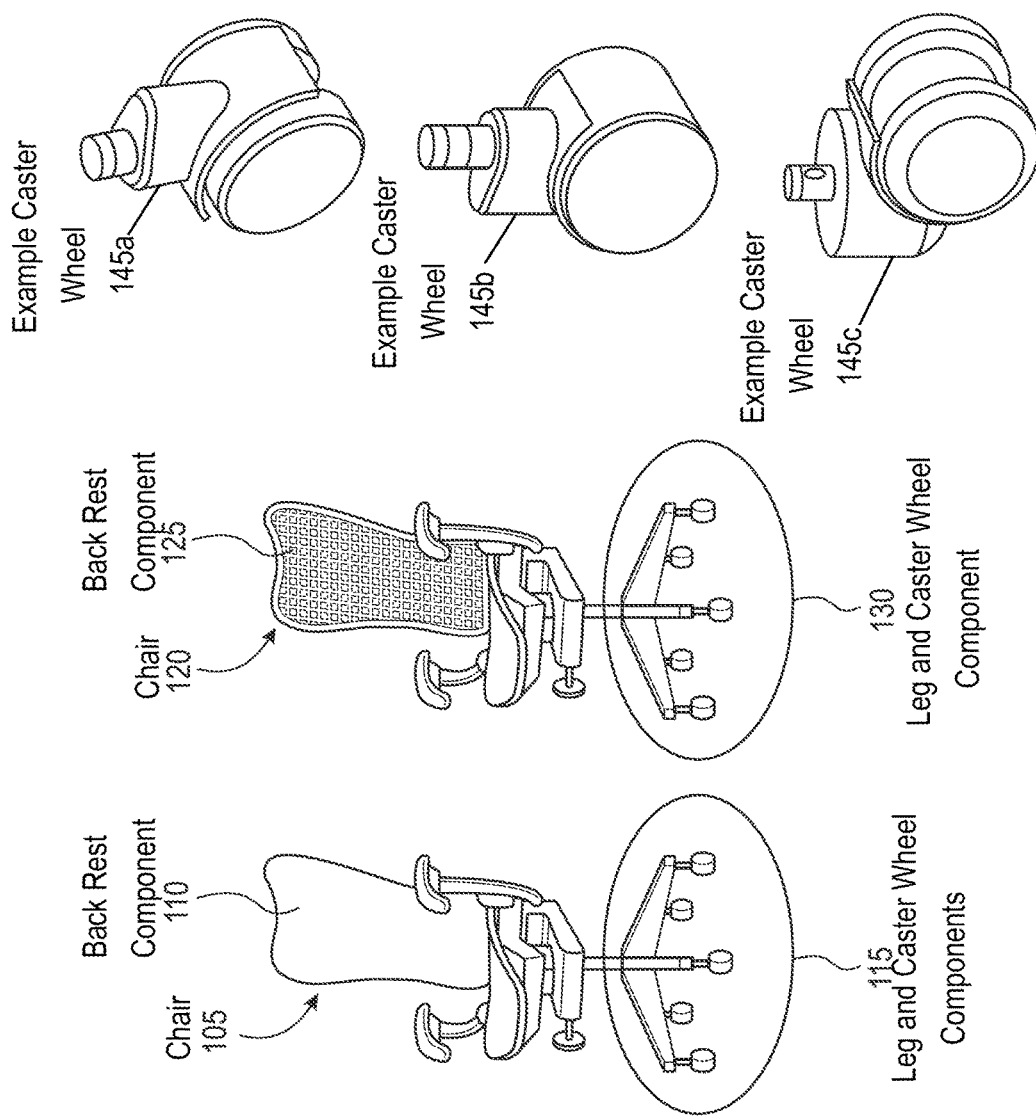

The disclosed methods and systems apply machine learning techniques to data regarding previously-used CAD model components to identify frequently-used components and predict mateable entities and corresponding mate types for those components. Based on these determinations, frequently-used components can be automatically added to a CAD model. For example, a manufacturer of chairs may use certain components frequently, such as, for example, caster wheels. Frequently-used components, or variants thereof, may exhibit similarities in form and function, such as mating behavior in assembly, loading and boundary conditions in simulation, etc. These similarities are not leveraged by current state-of-the-art CAD solutions. The disclosed methods and systems can leverage the similarities in mating behavior between frequently-used components and automatically mate those components (e.g., automatically mate caster wheels with a chair's legs in the assembly environment when a user "drags and drops" a caster wheel into the assembly). FIG. 1A illustrates example CAD assemblies of chair variants using various caster wheels. Chairs 105 and 120 include different back rest components 110, 125, but include similar legs and caster wheel components 115, 130. FIG. 1B illustrates a collection of different caster wheel components 145a-f.

Because frequently-used components exhibit similar functional behaviors in CAD assembly, simulation, motion etc., machine learning algorithms can be used to leverage these similarities to create mates automatically for frequently-used components (e.g., caster wheels). This leaves the designer with more time to focus on his goal of designing a better chair, for example, rather than wasting time and energy on repetitive drudgery.

Figure 2A:
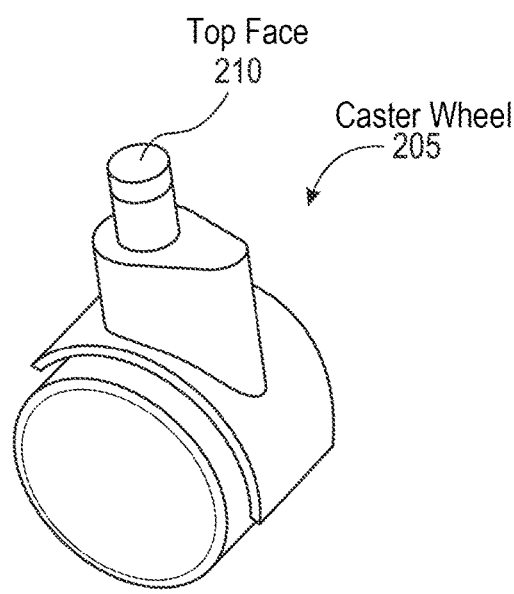
FIGS. 2A and 2B illustrate faces of an example CAD part.
Figure 2B:
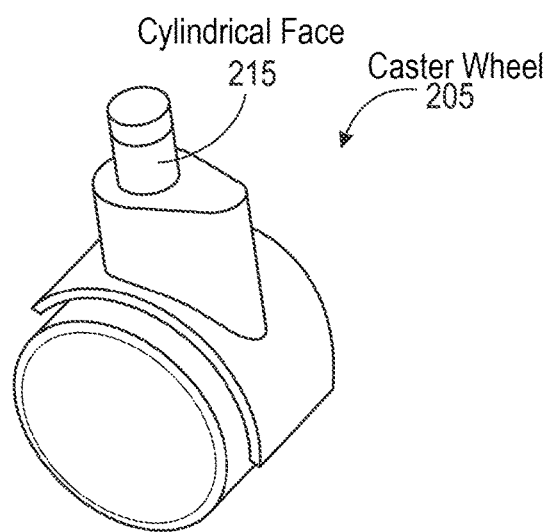

CAD models are assembled together using mates. For geometrically similar components, the mates tend to also be similar. This fact can be leveraged by using machine learning algorithms in conjunction with geometry descriptors of the components to provide for automation of mate creation between the frequently-used components with the rest of a CAD assembly. The following is a specific example involving automatically mating caster wheels to a chair. A caster wheel is typically mated to a leg of a chair using two mating constraints: (1) A coincident constraint between a top face of a shaft of the caster wheel and a corresponding face on the leg of chair. The top face 210 of a caster wheel 205 is highlighted in FIG. 2A. (2) A concentric constraint between the cylindrical face of a shaft of the caster wheel and a cylindrical face of a hole of the leg. The cylindrical face 215 of the shaft of the caster wheel 205 is highlighted in FIG. 2B.

Figure 3:
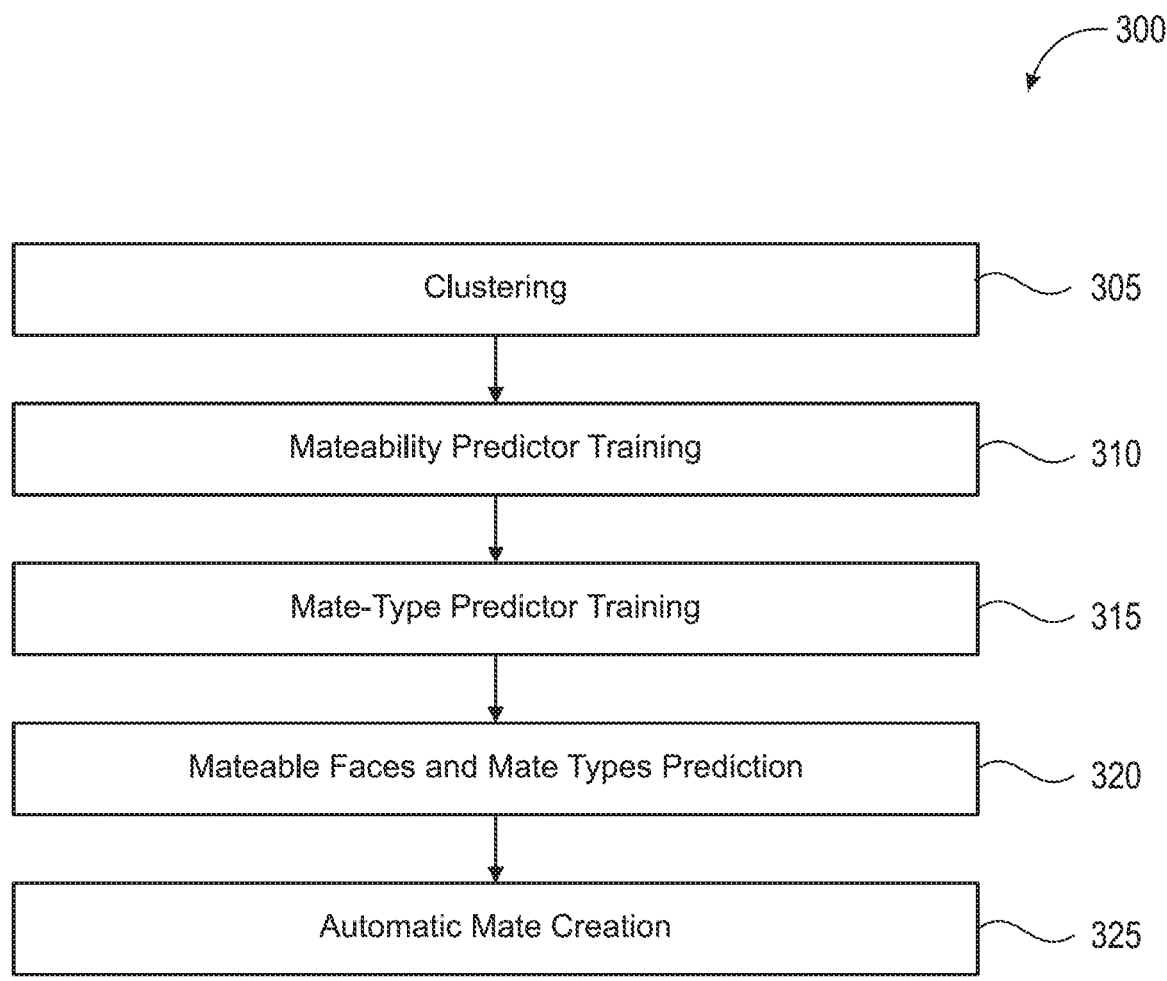
FIG. 3 is a flow chart illustrating automatic creation of mates between geometric entities in a CAD model of a real-world object, according to an example embodiment.

FIG. 3 is a flow chart illustrating automatic creation of mates between geometric entities in a CAD model of a real-world object, according to an example embodiment. The example method 300 includes Clustering 305, Mateability Predictor Training 310, Mate-Type Predictor Training 315, Mateable Faces and Mate Types Prediction 320, and Automatic Mate Creation 325. The following describes example implementations of the elements of the example method illustrated in FIG. 3.

Clustering 305: A database of CAD parts can be searched (crawled) and the parts divided into a number of clusters with similar parts. Each instance of a part used in an assembly can be added to a universe of parts that is to be divided into clusters. For example, if five instances of a part are used in a given assembly, then five instances of that part are added to the universe of parts. This can result in an increase in density of a cluster that includes those five parts, enabling a determination of a cluster with frequently used components. If a cluster of parts is relatively dense compared to other clusters, it can be inferred that the components in that cluster are used in CAD models more frequently. The output of the clustering portion of the example method 300 includes clusters of parts. The clusters that are of particular interest are clusters including frequently occurring components. As a specific example, searching through a database having components of chair assemblies can be expected to yield clusters of arm rests, seats, chair handles, back rests, legs, and caster wheels. Clustering is accomplished based on shape similarity and can be based on global shape signature representations of the parts, according to known methods. FIG. 1B illustrates an example cluster of caster wheels.

Figure 4:
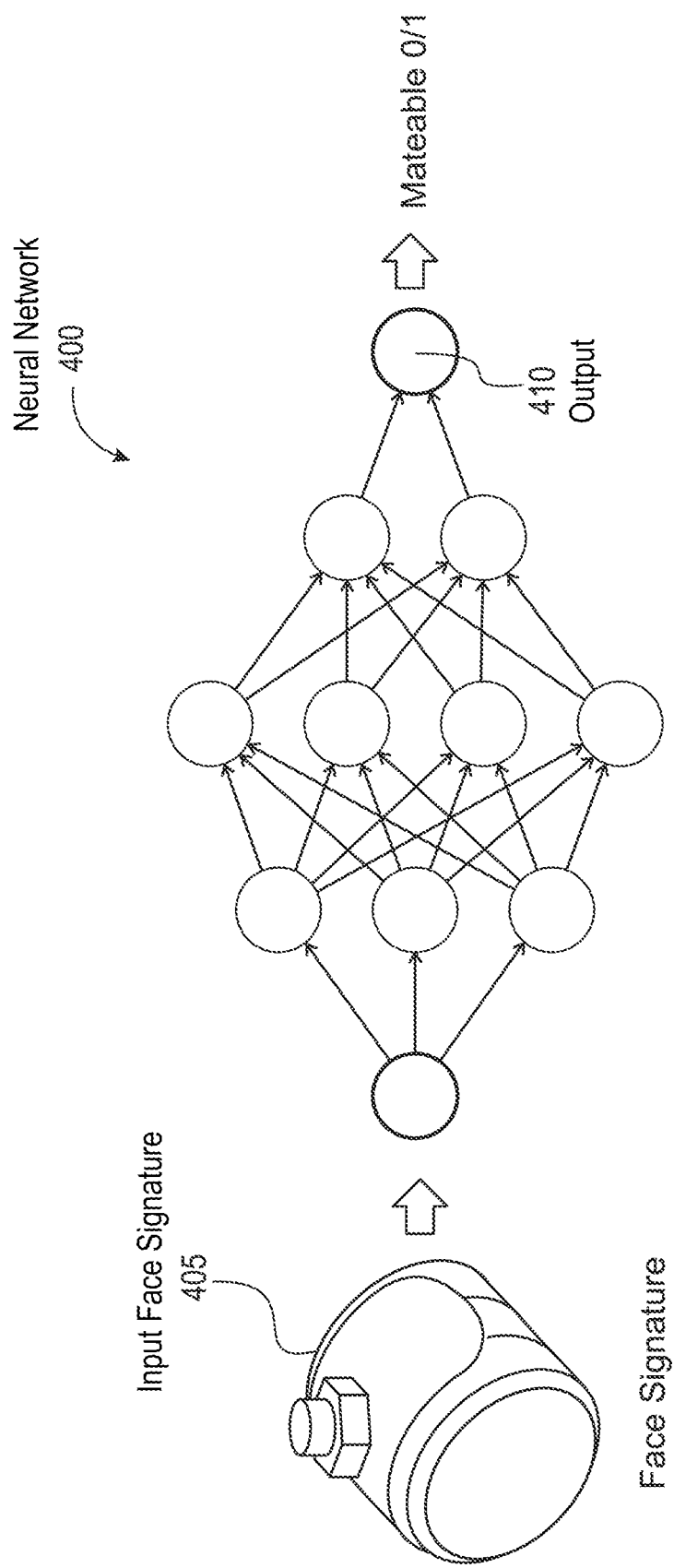
FIG. 4 illustrates a representation of an example neural network with associated inputs and outputs for a mateability predictor, according to an example embodiment.

Mateability Predictor Training 310: A neural network is trained with data from the mating geometries of a cluster for which the predictor is to be created. This neural network can be input with a contextual signature of a faces of a part, and the output of the neural network is a determination whether the geometry is mateable. The neural network can be trained with mateability information for all faces in the cluster. Separate neural networks may be trained for each constraint type, such as coincident constraints, concentric constraints, etc. The neural network(s) may be trained for only frequently-used components, such as caster wheels in the chair example. FIG. 4 represents an example neural network 400 with associated inputs 405 and outputs 410 for a mateability predictor. A face signature 405 can be provided to the neural network 400 as input, and a value of 0 or 1, for example can be provided as output 410, where 0 can indicates that the face is not mateable, and 1 can indicate that the face is mateable.

Figure 5:
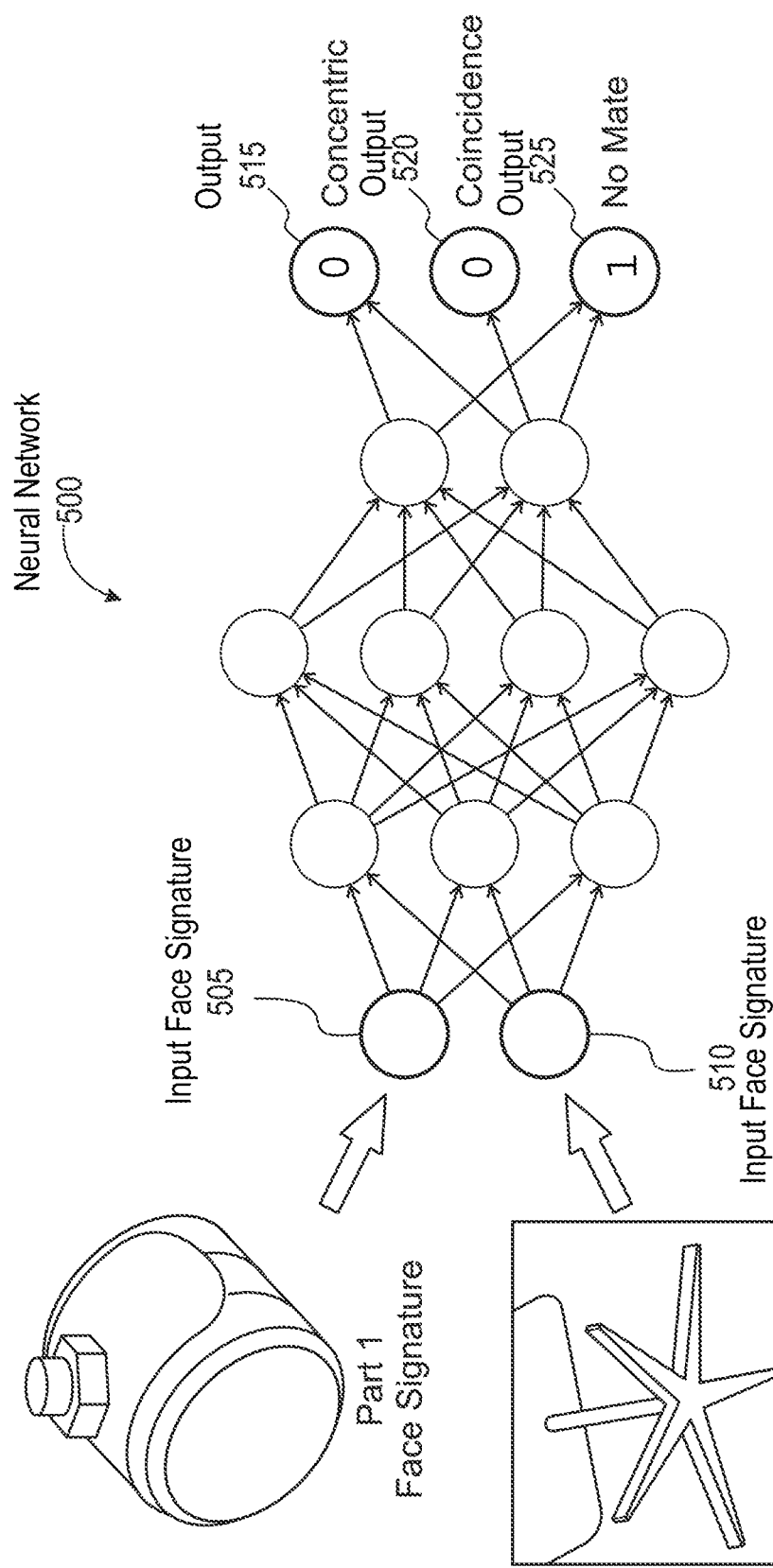
FIG. 5 illustrates a representation of an example neural network with associated inputs and outputs for a mate-type predictor, according to an example embodiment.

Mate-Type Predictor Training 315: Another neural network is trained to identify the mate types between two geometries. One set of geometries can be the mateable geometries of the cluster including frequently-used components. The other set of geometries can be all the geometries of components with which the frequently-used components mate. The accumulated data from all CAD assemblies including a frequently occurring component can be used as training data for the mate-type predictor neural network. The input to the neural network can be a combination of the contextual signatures of the mateable faces combined with contextual signatures of all faces of the mated components. In the specific example of the chair assembly, all geometries of a leg of the chair can be paired with the mateable faces of a caster wheel. This information can form the input to the neural network, while the output can be, for example, a concentric mate, coincident mate, or no mate at all. When the neural network is trained with several such faces, it can become capable of predicting the mate type between two geometries when input with a mateable face from a caster wheel and any face from a leg of the chair. FIG. 5 represents an example neural network 500 with associated inputs 505, 510 and outputs 515, 520, 525 for a mate-type predictor. Face signatures 505, 510 can be provided to the neural network 500 as input, and values of 0 or 1, for example can be provided as output for each mate type 515, 520, 525. For each mate type, 0 can indicate that the faces are not mateable for that type, and 1 can indicate that the faces are mateable for that type.

Figure 6B:
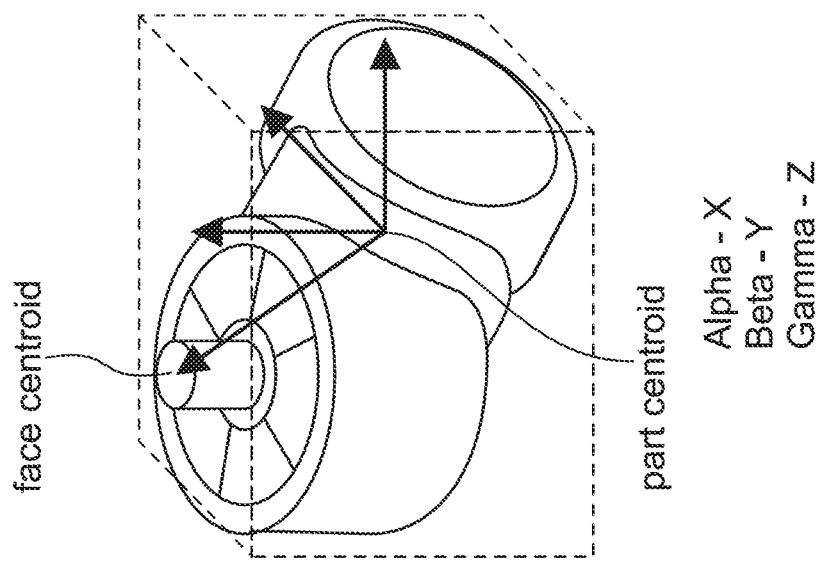
FIGS. 6A and 6B illustrate example numerical representations of contextual locations of a face with respect to a part.
Figure 6A:
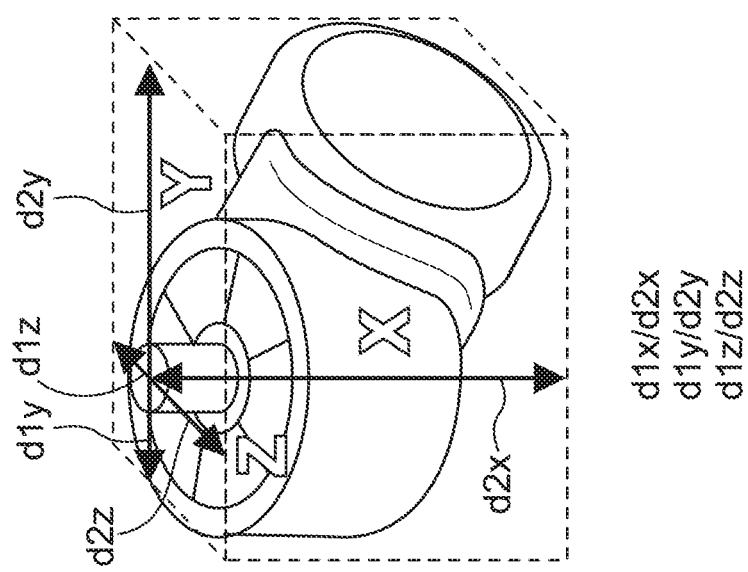

The contextual signature for a face ("face signature") can be a numerical representation of the contextual location of the face with respect to its particular part. The contextual signature can include any of the following numerical representations. A bounding box (e.g., an Object Oriented Bounding Box (OOBB)) can be computed for the part with the corners of the bounding box and the respective bounding planes of the bounding box. The centroid of the face in the part can be computed, and the ratios of the distances of the centroid of the face from the six sides of the bounding box can be calculated. These ratios may be referred to as d1x/d2x, d1y/d2y, d1z/d2z as shown in FIG. 6A. In FIG. 6A, d1x is 0 as the face is at the top plane of the bounding box, thus d1x is not shown in FIG. 6A. In calculating the ratios, a convention of using the smaller distance as the numerator can be followed. These ratios can represent the location of the face in the context of its part. For example, the top face of a stem of a castor wheel will have similar ratios along X, Y, Z axes for reasonable variations of different shapes and sizes of caster wheels.

Similar to the distance ratios, angles can be computed between the vector subtended between the centroid of the face and the centroid of the part. These angles, with the principal axes of Moment of Inertia, can be represented as Alpha, Beta, and Gamma, as shown in FIG. 6B.

A ratio of the area of the face to the summation of the area of all faces can be calculated as a mathematical representation of relative size of the face in the context of the part.

A ratio of the square of the perimeter of the face to the area of the face can be calculated as a mathematical representation of the shape of the face. For example, a circular face has a distinct ratio compared to a square face. Any or all the above calculations can form a part of the contextual signature that is used to represent the face in the context of its part and used to form the inputs to the neural networks.

Mateable Faces and Mate Types Prediction 320: When a designer inserts a part (e.g., caster wheel) in the assembly environment, the inputs to the mateability predictor (e.g., face signatures) can be created and fed to the mateability predictor. The mateability predictor provides a determination of the faces that may be mateable in the newly-inserted part. In the specific example of the chair, the faces determined to be mateable are provided as input to the mate-type predictor. Pairing the faces with the faces of a leg of the chair, inputs are created for the mate-type predictor. The mate-type predictor provides as output the mate type(s) that may be possible between the parts (e.g., the caster wheel and the leg of the chair). The type of mate predicted could be, for example, concentric, coincident, other mate type, or no mate possible.

Automatic Mate Creation 325: After the mate types are predicted, mates can be created between the frequently-used component (e.g., caster wheel) and the existing component (e.g., chair leg) in the assembly. The number of instances of the caster wheel can be determined, and the relevant mates between the geometries of the caster wheel and the leg of the chair are created. FIGS. 7A-C illustrate representations of example steps when a CAD designer adds a caster wheel 710a to a chair assembly 700. As represented in FIG. 7A, the mating faces for the caster wheel 710a are identified, as described above, using the mateability predictor. As represented in FIG. 7B, the mating geometries and the mate type are identified, as described above, using the mate type predictor. The mate type predictor can also determine the number of instances of the caster wheel to create. In this example, five caster wheels 710a-e are creates, each corresponding to a mate-point on the leg 705 of the chair 700. As represented in FIG. 7C, the mates between the caster wheels 710a-e and leg 705 of the chair 700 are created using the identified mating geometries and mate types. While the above example method has been described in the context of a chair assembly, the method can be used with any frequently occurring component. The mateability and mate-type predictors can be trained for any frequently occurring component having sufficient training data.

Figure 8:
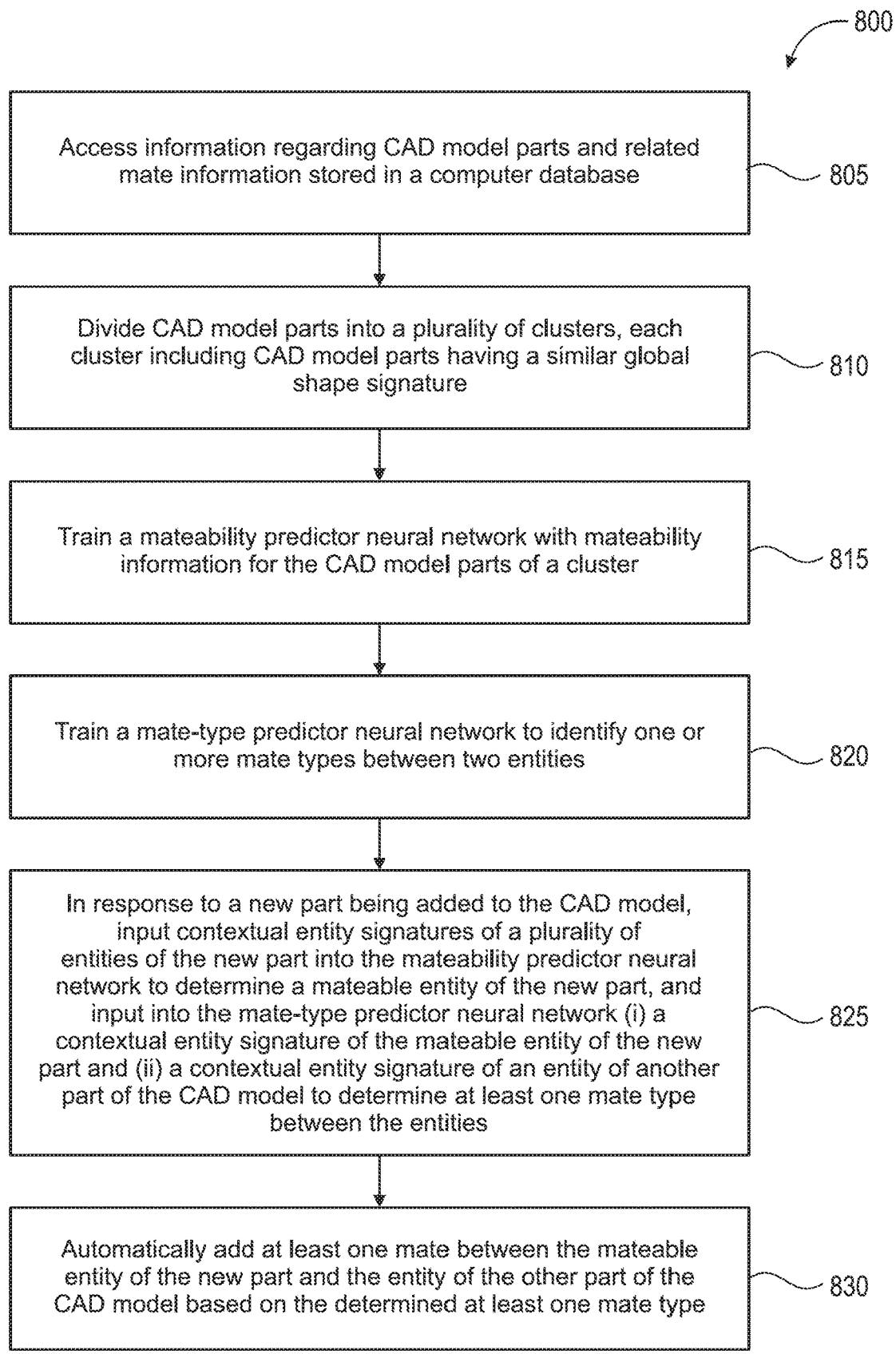
FIG. 8 is a flow chart illustrating a method of automatically creating mates between geometric entities in a CAD model of a real-world object, according to an example embodiment.

FIG. 8 is a flow chart illustrating a method 800 of automatically creating mates between geometric entities in a CAD model of a real-world object, according to an example embodiment. The example method includes accessing 805 information regarding CAD model parts and related mate information stored in a computer database. The method further includes dividing 810 CAD model parts into a plurality of clusters, where each cluster includes CAD model parts having a similar global shape signature. A mateability predictor neural network is trained 815 with mateability information for the CAD model parts of a cluster. The mateability predictor neural network is configured to provide mateability information in response to input of a contextual signature of an entity of a CAD model part. A mate-type predictor neural network is trained 820 to identify one or more mate types between two entities. The method further includes, in response to a new part being added to the CAD model, inputting 825 contextual signatures of a plurality of entities of the new part into the mateability predictor neural network to determine a mateable entity of the new part, and inputting into the mate-type predictor neural network (i) a contextual signature of the mateable entity of the new part and (ii) a contextual signature of an entity of another part of the CAD model to determine at least one mate type between the entities. At least one mate between the mateable entity of the new part and the entity of the other part of the CAD model is automatically added 830 based on the determined at least one mate type.

Figure 9:
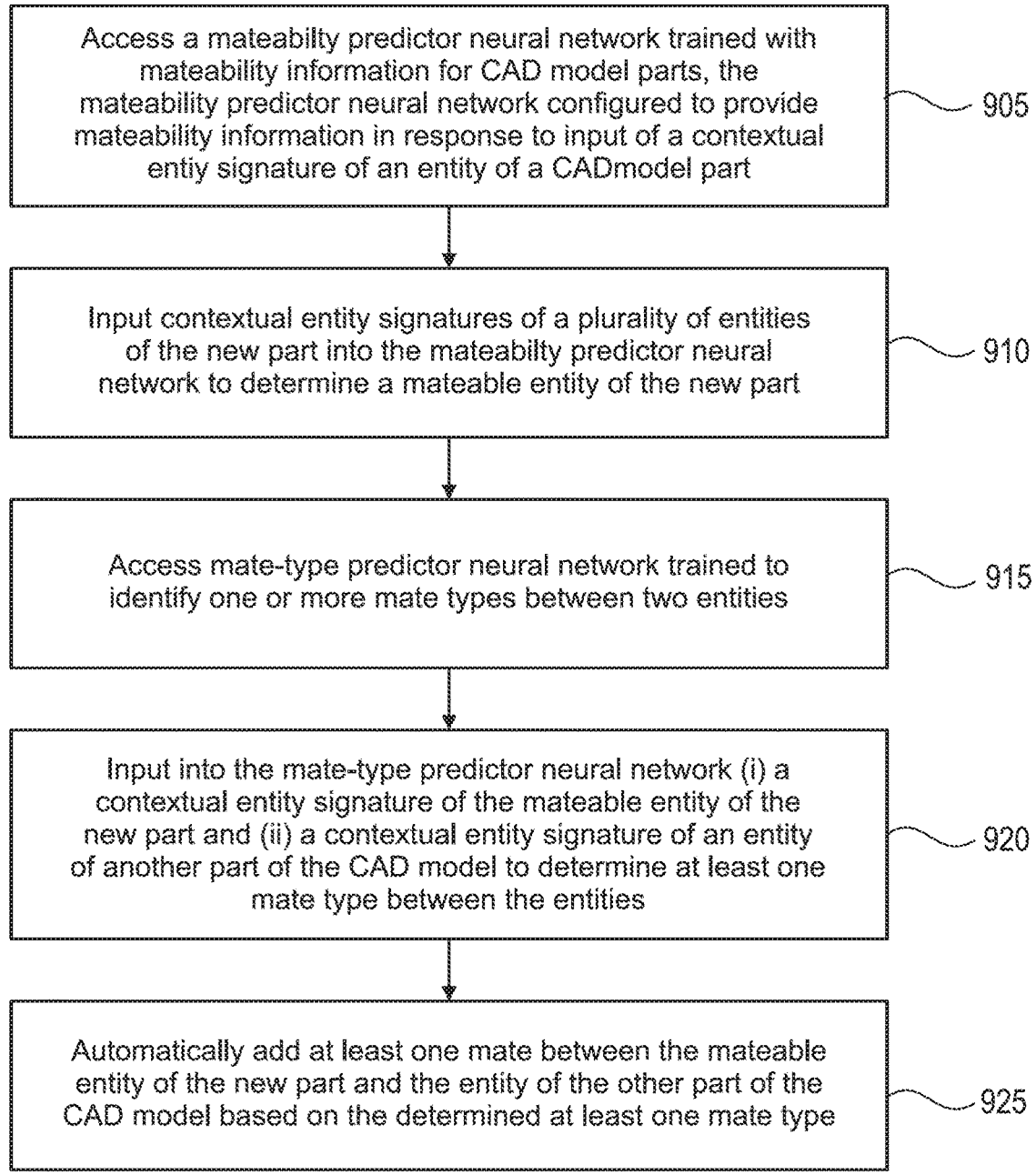
FIG. 9 is a flow chart illustrating a method of automatically creating mates between geometric entities in a CAD model of a real-world object and a new part, according to an example embodiment.

FIG. 9 is a flow chart illustrating a method 900 of automatically creating mates between geometric entities in a CAD model of a real-world object and a new part, according to an example embodiment. The example method includes accessing 905 a mateability predictor neural network trained with mateability information for CAD model parts and inputting 910 contextual signatures of a plurality of entities of the new part into the mateability predictor neural network to determine a mateable entity of the new part. The mateability predictor neural network is configured to provide mateability information in response to input of a contextual signature of an entity of a CAD model part. The method further includes accessing 915 a mate-type predictor neural network trained to identify one or more mate types between two entities, and inputting 920 into the mate-type predictor neural network (i) a contextual signature of the mateable entity of the new part and (ii) a contextual signature of an entity of another part of the CAD model to determine at least one mate type between the entities. At least one mate is automatically added 925 between the mateable entity of the new part and the entity of the other part of the CAD model based on the determined at least one mate type.

Figure 10:
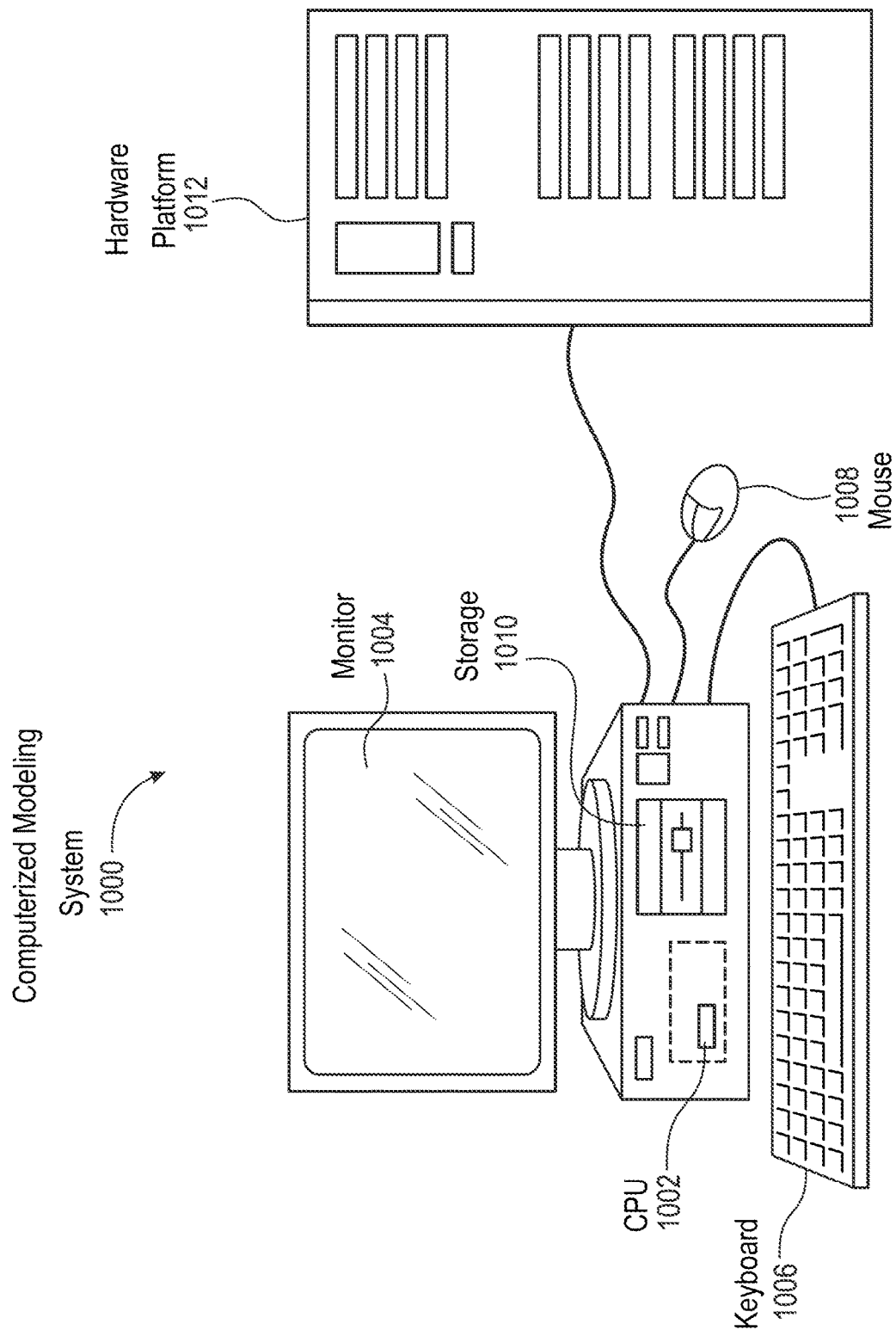
FIG. 10 is a schematic diagram of a computer system in which embodiments may be implemented.

FIG. 10 illustrates a computerized modeling system 1000 that includes a CPU 1002, a computer monitor 1004, a keyboard input device 1006, a mouse input device 1008, and a storage device 1010. The CPU 1002, computer monitor 1004, keyboard 1006, mouse 1008, and storage device 1010 can include commonly available computer hardware devices. For example, the CPU 1002 can include an Intel-based processor. The mouse 1008 may have conventional left and right buttons that the design engineer may press to issue a command to a software program being executed by the CPU 1002. As an alternative or in addition to the mouse 1008, the computerized modeling system 1000 can include a pointing device such as a trackball, touch-sensitive pad, or pointing device and buttons built into the keyboard 1006. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 2000, Windows XP, Windows ME, Windows 7 et seq., UNIX, Linux, or MAC OS operating systems.

Additional computer processing units and hardware devices (e.g., rapid prototyping, video, and printer devices) may be included in the computerized modeling system 1000. Furthermore, the computerized modeling system 1000 may include network hardware and software, thereby enabling communication to a hardware platform 1012, and facilitating communication between numerous computer systems that include a CPU and a storage system, among other computer components.

Computer-aided modeling software (e.g., processes 300, 800, and 900) may be stored on the storage device 1010 and loaded into and executed by the CPU 1002. The modeling software allows a design engineer to create and modify a 3D model and implements aspects of the embodiments described herein. The CPU 1002 uses the computer monitor 1004 to display a 3D model and other aspects thereof as described. Using the keyboard 1006 and the mouse 1008, the design engineer can enter and modify data associated with the 3D model. The CPU 1002 accepts and processes input from the keyboard 1006 and mouse 1008. The CPU 1002 processes the input along with the data associated with the 3D model and makes corresponding and appropriate changes to that which is displayed on the computer monitor 1004 as commanded by the modeling software. In one embodiment, the modeling software is based on a solid modeling system that may be used to construct a 3D model consisting of one or more solid and surface bodies.

Embodiments may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor receives instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks, such as internal hard disks and removable disks; magneto-optical disks; and CD-ROM disks. Any of the foregoing may be supplemented by, or incorporated in, custom-designed ASICs (application-specific integrated circuits).

An advantage of the embodiments disclosed herein is alleviation of issues that occur when the tolerances applied to components are computed incorrectly in prior methods and systems. Such issues can lead, downstream, to parts that are manufactured per dimensional requirements, but do not assemble due to interferences, which leads to costly rework scenarios or scrapped parts. Not only is the calculation of each tolerance done automatically, but the necessary dimensions, tolerances, and display items are automatically generated. Another advantage of the disclosed embodiments is the systematic deduction of necessary datum features of a target component given datums defined on a source component. This is advantageous because the correct application of datums is one of the biggest challenges when applying geometric dimensions and tolerances. The disclosed embodiments solve this challenge.

While example embodiments have been particularly shown and described, it will be understood by those skilled in the art that various changes in form and details may be made therein without departing from the scope of the embodiments encompassed by the appended claims. For example, implementations may change the order in which operations are performed. Further, depending on the needs of an implementation, particular operations described herein may be implemented as a combined operation, eliminated, added to, or otherwise rearranged. Further, particular user interface operations relative to a mouse (e.g., click, drag, drop) are by way of illustration and not limitation. Other user interface operations for selecting, moving, placing, etc., model or design data are suitable. The disclosed methods and systems can be implemented, for example, with a three-layered neural network and can use the Keras library for training the neural networks. The particular topology of the neural network as well as the particular library used for implementation can result in different implementations, though the essence of the solution is similar.

What is claimed is:

1. A computer-implemented method of automatically creating mates between geometric entities in a computer-aided design (CAD) model of a real-world object, the method comprising:
   accessing information regarding CAD model parts and related mateability information stored in a computer database;

dividing CAD model parts into a plurality of clusters, each cluster including CAD model parts having a similar global shape signature;

training a mateability predictor neural network with mateability information for the CAD model parts of a cluster, the mateability predictor neural network configured to provide mateability information in response to input of a contextual signature of an entity of a CAD model part;

training a mate-type predictor neural network to identify one or more mate types between two entities;

in response to a new part being added to the CAD model:
    inputting contextual signatures of a plurality of entities of the new part into the mateability predictor neural network to determine a mateable entity of the new part; and
    inputting into the mate-type predictor neural network (i) a contextual signature of the mateable entity of the new part and (ii) a contextual signature of an entity of another part of the CAD model to determine at least one mate type between the entities; and
    automatically adding at least one mate between the mateable entity of the new part and the entity of the another part of the CAD model based on the determined at least one mate type.

2. A computer-implemented method as in claim 1 wherein a contextual signature for an entity of a part is a numerical representation of contextual locations of the entity within the part.

3. A computer-implemented method as in claim 2 wherein the contextual signature is calculated by computing ratios between distances of a centroid of the entity and planes of a bounding box around the part.

4. A computer-implemented method as in claim 1 wherein dividing CAD model parts into a plurality of clusters includes:
    for each of a plurality of parts in the computer database, calculating a global shape signature of the part; and
    clustering a plurality of parts if the global shape signatures of the parts are within a threshold amount.

5. A computer-implemented method as in claim 1 wherein training the mateability predictor neural network includes training the mateability predictor neural network with mateability information for the CAD model parts of a cluster having a relatively higher density compared to other clusters, the relatively higher density of the cluster indicating that the parts of the cluster are frequently used in CAD models.

6. A computer-implemented method as in claim 1 wherein training the mateability predictor neural network includes training the mateability predictor neural network with mateability information for all entities of the CAD model parts.

7. A computer-implemented method as in claim 1 wherein training the mateability predictor neural network includes training multiple mateability predictor neural networks, each corresponding to a different mate type.

8. A computer-implemented method as in claim 1 wherein training the mate-type predictor neural network includes training the mate-type predictor neural network with (i) mateable entities of a cluster including frequently-used parts and (ii) all entities of parts with which the frequently-used parts mate.

9. A computer-implemented method as in claim 1 wherein automatically adding at least one mate includes:
    determining a number of instances of the new part that are mateable with the another part of the CAD model;
    creating the number of instances of the new part; and
    mating entities of all instances of the new part to distinct entities of the another part of the CAD model.

10. A computer-implemented method of automatically creating mates between geometric entities of a computer-aided design (CAD) model of a real-world object and a new part, the method comprising:
    accessing a mateability predictor neural network trained with mateability information for CAD model parts, the mateability predictor neural network configured to provide mateability information in response to input of a contextual signature of an entity of a CAD model part;
    inputting contextual signatures of a plurality of entities of the new part into the mateability predictor neural network to determine a mateable entity of the new part;
    accessing a mate-type predictor neural network trained to identify one or more mate types between two entities;
    inputting into the mate-type predictor neural network (i) a contextual signature of the mateable entity of the new part and (ii) a contextual signature of an entity of another part of the CAD model to determine at least one mate type between the entities; and
    automatically adding at least one mate between the mateable entity of the new part and the entity of the another part of the CAD model based on the determined at least one mate type.

11. A computer-aided design (CAD) system comprising:
    a computer database configured to store information regarding CAD model parts and related mateability information; and
    a processor operatively coupled to the computer database and configured to:
        divide CAD model parts into a plurality of clusters, each cluster including CAD model parts having a similar global shape signature;
        train a mateability predictor neural network with mateability information for the CAD model parts of a cluster, the mateability predictor neural network configured to provide mateability information in response to input of a contextual signature of an entity of a CAD model part;
        train a mate-type predictor neural network to identify one or more mate types between two entities;
        in response to a new part being added to the CAD model:
            input contextual signatures of a plurality of entities of the new part into the mateability predictor neural network to determine a mateable entity of the new part; and
            input into the mate-type predictor neural network (i) a contextual signature of the mateable entity of the new part and (ii) a contextual signature of an entity of another part of the CAD model to determine at least one mate type between the entities; and
        automatically add at least one mate between the mateable entity of the new part and the entity of the another part of the CAD model based on the determined at least one mate type.

12. A CAD system as in claim 11 wherein a contextual signature for an entity of a part is a numerical representation of a contextual location of the entity within the part.

13. A CAD system as in claim 12 wherein the processor is configured to calculate the contextual signature by computing ratios between distances of a centroid of the entity and planes of a bounding box around the part.

14. A CAD system as in claim 11 wherein the processor is configured to divide CAD model parts into a plurality of clusters by:
for each of a plurality of parts in the computer database, calculating a global shape signature of the part; and
clustering a plurality of parts if the global shape signatures of the parts are within a threshold amount.

15. A CAD system as in claim 11 wherein the processor is configured to train the mateability predictor neural network with mateability information for the CAD model parts of a cluster having a relatively higher density compared to other clusters, the relatively higher density of the cluster indicating that the parts of the cluster are frequently used in CAD models.

16. A CAD system as in claim 11 wherein the processor is configured to train the mateability predictor neural network with mateability information for all entities of the CAD model parts.

17. A CAD system as in claim 11 wherein the processor is configured to train multiple mateability predictor neural networks, each corresponding to a different mate type.

18. A CAD system as in claim 11 wherein the processor is configured to train the mate-type predictor neural network with (i) mateable entities of a cluster including frequently-used parts and (ii) all entities of parts with which the frequently-used parts mate.

19. A CAD system as in claim 11 wherein the processor is configured to:
determine a number of instances of the new part that are mateable with the another part of the CAD model;
create the number of instances of the new part; and
mate entities of all instances of the new part to distinct entities of the another part of the CAD model.

20. A computer-aided design (CAD) system comprising:
a computer database configured to store information regarding CAD model parts and related mateability information; and
a processor operatively coupled to the computer database and configured to:
access a mateability predictor neural network trained with mateability information for CAD model parts, the mateability predictor neural network configured to provide mateability information in response to input of a contextual signature of an entity of a CAD model part;
input contextual signatures of a plurality of entities of the new part into the mateability predictor neural network to determine a mateable entity of the new part;
access a mate-type predictor neural network trained to identify one or more mate types between two entities;
input into the mate-type predictor neural network (i) a contextual signature of the mateable entity of the new part and (ii) a contextual signature of an entity of another part of the CAD model to determine at least one mate type between the entities; and
automatically add at least one mate between the mateable entity of the new part and the entity of the another part of the CAD model based on the determined at least one mate type.

* * * * *